US012672195B2

(12) United States Patent
Yuan et al.

(10) Patent No.: US 12,672,195 B2
(45) Date of Patent: Jun. 30, 2026

(54) KNOWN TRANSMISSION CONTROL INDICATOR DURATION

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 238 days.

(21) Appl. No.: 18/547,817

(22) PCT Filed: Apr. 20, 2021

(86) PCT No.: PCT/CN2021/088276
§ 371 (c)(1),
(2) Date: Aug. 24, 2023

(87) PCT Pub. No.: WO2022/222016
PCT Pub. Date: Oct. 27, 2022

(65) Prior Publication Data
US 2024/0129993 A1     Apr. 18, 2024

(51) Int. Cl.
*H04W 76/20*     (2018.01)
*H04L 5/00*     (2006.01)
*H04W 8/22*     (2009.01)

(52) U.S. Cl.
CPC ........... *H04W 76/20* (2018.02); *H04L 5/0051* (2013.01); *H04L 5/0096* (2013.01); *H04W 8/22* (2013.01)

(58) Field of Classification Search
CPC ...... H04W 76/20; H04W 8/22; H04L 5/0051; H04L 5/0096
See application file for complete search history.

(56) References Cited

U.S. PATENT DOCUMENTS

| 10,944,455 | B2 | 3/2021 | John Wilson et al. |
| 2020/0112974 | A1 | 4/2020 | Sun et al. |

(Continued)

FOREIGN PATENT DOCUMENTS

| CN | 109076560 A | 12/2018 |
| WO | 2019165239 | 8/2019 |
| WO | WO-2020165736 A1 | 8/2020 |

OTHER PUBLICATIONS

"RAN4 #92-Bis Meeting Report", 3GPP TSG-RAN WG4 Meeting #93, R4-xxxxxxx, 3rd Generation Partnership Project, Mobile Competence Centre, 650, Route Des Lucioles, F-06921 Sophia-Antipolis Cedex, France, vol. RAN WG4, No. Reno, US, Nov. 18, 2019-Nov. 22, 2019, Oct. 19, 2019, 480 Pages, XP051798476, section 8.

(Continued)

*Primary Examiner* — Jackie Zuniga Abad
(74) *Attorney, Agent, or Firm* — Harrity & Harrity, LLP

(57) ABSTRACT

Various aspects of the present disclosure generally relate to wireless communication. In some aspects, a user equipment (UE) may start, from a last transmission of a reference signal resource, a known transmission control indicator (TCI) duration during which a TCI state switch command is to be received. The known TCI duration may end after a maximum time duration and may exclude an invalid period. The UE may receive the TCI state switch command during the known TCI duration. Numerous other aspects are described.

24 Claims, 8 Drawing Sheets

(56) References Cited

U.S. PATENT DOCUMENTS

| | | | |
|---|---|---|---|
| 2020/0137741 A1 | 4/2020 | Zhou et al. | |
| 2020/0351842 A1 | 11/2020 | Lin | |
| 2021/0111851 A1 | 4/2021 | Lin | |
| 2024/0023045 A1* | 1/2024 | Da Silva | ............. H04W 36/249 |

OTHER PUBLICATIONS

Supplementary European Search Report—EP21937267—Search Authority—The Hague—Dec. 9, 2024.
International Search Report and Written Opinion—PCT/CN2021/088276—ISA/EPO—Jan. 19, 2022.
Mediatek Inc: "Remaining Issues on RRM in R15", 3GPP Draft, 3GPP TSG-RAN WG4 Meeting #97-e, R4-2014760, Electronic Meeting, Nov. 2-Nov. 13, 2020, 4 Pages, Section 4.
ZTE: "Enhancements on Multi-Beam Operation", 3GPP Draft, 3GPP TSG RAN WG1 Meeting #104b-e, R1-2102660, e-Meeting, Apr. 12-20, 2021, 25 Pages, Section 4.2.

* cited by examiner

510   Start, from a last transmission of a reference signal resource, a known transmission control indicator (TCI) duration during which a TCI state switch command is to be received, where the known TCI duration ends after a maximum time duration and excludes an invalid period 520   Receive the TCI state switch command during the known TCI duration

500

Start, from a last transmission of a reference signal resource to a UE, a known TCI duration during which a TCI state switch command is to be received by the UE, where the known TCI duration ends after a maximum time duration and excludes an invalid period

610

Transmit the TCI state switch command to the UE during the known TCI duration

620

600

KNOWN TRANSMISSION CONTROL INDICATOR DURATION

CROSS-REFERENCE TO RELATED APPLICATION

This Patent Application is a 371 national stage of PCT Application No. PCT/CN2021/088276, filed on Apr. 20, 2021, entitled "KNOWN TRANSMISSION CONTROL INDICATOR DURATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for using a known transmission control indicator duration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" or "forward link" refers to the communication link from the BS to the UE, and "uplink or "reverse link" refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes starting, from a last transmission of a reference signal resource, a known transmission control indicator (TCI) duration during which a TCI state switch command is to be received. The known TCI duration ends after a maximum time duration and excludes an invalid period. The method also includes receiving the TCI state switch command during the known TCI duration.

In some aspects, a method of wireless communication performed by a base station includes starting, from a last transmission of a reference signal resource to a UE, a known TCI duration during which a TCI state switch command is to be received by the UE. The known TCI duration ends after a maximum time duration and excludes an invalid period. The method may include transmitting the TCI state switch command to the UE during the known TCI duration.

In some aspects, a UE for wireless communication includes a memory and one or more processors, coupled to the memory, configured to start, from a last transmission of a reference signal resource, a known TCI duration during which a TCI state switch command is to be received. The known TCI duration ends after a maximum time duration and excludes an invalid period. The one or more processors are configured to receive the TCI state switch command during the known TCI duration.

In some aspects, a base station for wireless communication includes a memory and one or more processors, coupled to the memory, configured to start, from a last transmission of a reference signal resource to a UE, a known TCI duration during which a TCI state switch command is to be received by the UE. The known TCI duration ends after a maximum time duration and excludes an invalid period. The one or more processors are configured to transmit the TCI state switch command to the UE during the known TCI duration.

In some aspects, a non-transitory computer-readable medium storing a set of instructions for wireless communication includes one or more instructions that, when executed by one or more processors of a UE, cause the UE to start, from a last transmission of a reference signal resource, a known TCI duration during which a TCI state switch command is to be received, where the known TCI duration ends after a maximum time duration and excludes an invalid period, and receive the TCI state switch command during the known TCI duration.

In some aspects, a non-transitory computer-readable medium storing a set of instructions for wireless communication includes one or more instructions that, when executed by one or more processors of a base station, cause the base station to start, from a last transmission of a reference signal resource to a UE, a known TCI duration during which a TCI state switch command is to be received by the UE, where the known TCI duration ends after a maximum time duration and excludes an invalid period, and transmit the TCI state switch command to the UE during the known TCI duration.

In some aspects, an apparatus for wireless communication includes means for starting, from a last transmission of a reference signal resource, a known TCI duration during which a TCI state switch command is to be received, where the known TCI duration ends after a maximum time duration and excludes an invalid period, and means for receiving the TCI state switch command during the known TCI duration.

In some aspects, an apparatus for wireless communication includes means for starting, from a last transmission of a reference signal resource to another apparatus, a known TCI duration during which a TCI state switch command is to be received by the UE, where the known TCI duration ends after a maximum time duration and excludes an invalid period, and means for transmitting the TCI state switch command to the other apparatus during the known TCI duration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
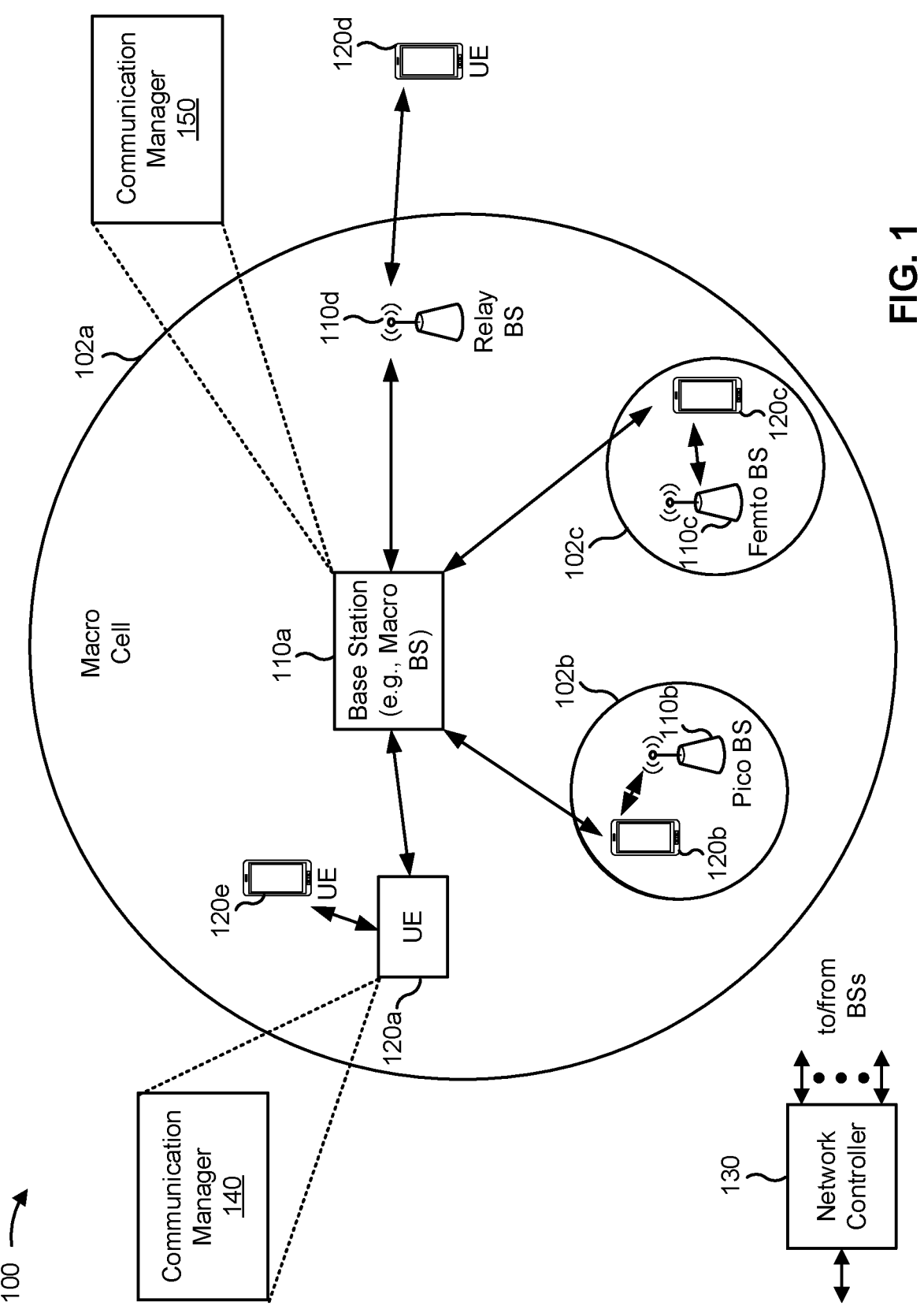
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, the UE 120 may include a communication manager 140. As described in more detail elsewhere herein, the communication manager 140 may start, from a last transmission of a reference signal resource, a known transmission control indicator (TCI) duration during which a TCI state switch command is to be received. The known TCI duration ends after a maximum time duration and may exclude an invalid period. The communication manager 140 may receive the TCI state switch command during the known TCI duration. Additionally, or alternatively, the communication manager 140 may perform one or more other operations described herein.

In some aspects, the base station 110 may include a communication manager 150. As described in more detail elsewhere herein, the communication manager 150 may start, from a last transmission of a reference signal resource to a UE, a known TCI duration during which a TCI state switch command is to be received by the UE. The known TCI duration ends after a maximum time duration and excludes an invalid period. The communication manager 150 may transmit the TCI state switch command to the UE during the known TCI duration. Additionally, or alternatively, the communication manager 150 may perform one or more other operations described herein.

As indicated above, FIG. 1 is provided as an example. Other examples may differ from what is described with regard to FIG. 1.

Figure 2:
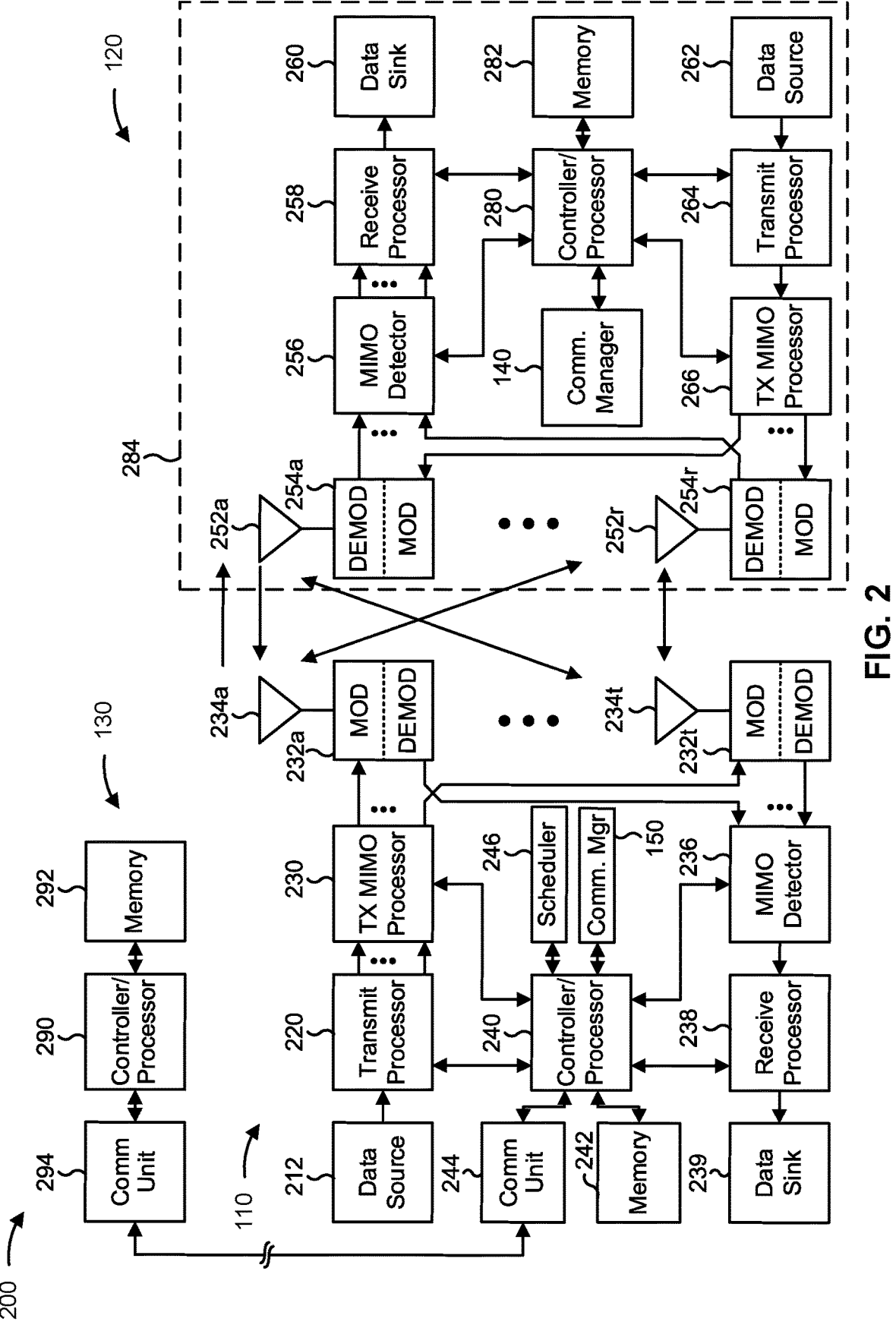
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate)

the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 1-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 1-8).

Controller/processor 240 of base station 110, controller/processor 280 of UE 120, and/or any other component(s) of FIG. 2 may perform one or more techniques associated with using a known TCI duration, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 500 of FIG. 5, process 600 of FIG. 6, and/or other processes as described herein. In some aspects, executing instructions may include running the instructions, converting the instructions, compiling the instructions, and/or interpreting the instructions, among other examples.

In some aspects, the UE 120 includes means for starting, from a last transmission of a reference signal resource, a known TCI duration during which a TCI state switch command is to be received, where the known TCI duration ends after a maximum time duration and excludes an invalid period, and/or means for receiving the TCI state switch command during the known TCI duration. The means for the UE 120 to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282. In some aspects, the base station 110 includes means for starting, from a last transmission of a reference signal resource to a UE, a known TCI duration during which a TCI state switch command is to be received by the UE, where the known TCI duration ends after a maximum time duration and excludes an invalid period, and/or means for transmitting the TCI state switch command to the UE during the known TCI duration. The means for the base station 110 to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
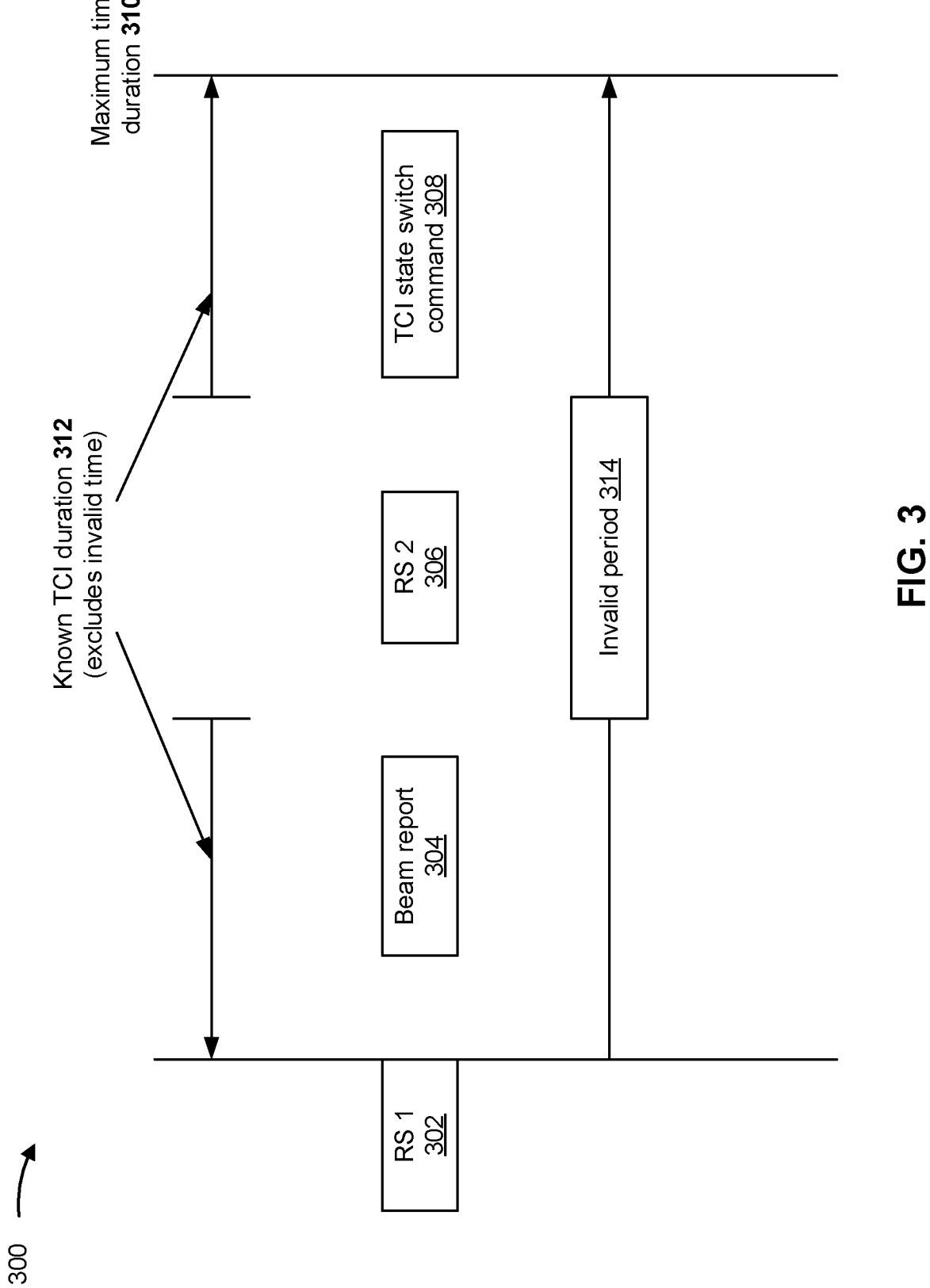
FIG. 3 is a diagram illustrating an example of a known transmission control indicator (TCI) duration, in accordance with the present disclosure.

FIG. 3 is a diagram illustrating an example 300 of a known TCI duration, in accordance with the present disclosure.

Example 300 shows a first reference signal occasion (RS 1) 302 and a beam report 304 with measurements of reference signals during the first reference signal occasion. At the first reference signal occasion 302, a UE (e.g., UE 120) may measure reference signals for multiple beams and transmit a beam report 304. The beam report 304 may include layer 1 (L1)-RSRP measurements for a target TCI state and/or for one or more of the multiple beams. The beam report 304 may indicate one or more beam indices for one or more preferred beams (e.g., beam index 2 out of beam indices 1, 2, and 3). Example 300 also shows a second reference signal occasion (RS 2) 306, because the reference signal occasions may be periodic.

The reference signal 302 or beam report 304 may also involve information for beam management and beam failure detection (BFD). In some aspects, a base station (e.g., base station 110) may configure more than two beams for a control resource set (CORESET). For example, to enable a single-frequency network, the base station 110 may configure the UE 120 with a CORESET of two TCI states. Accordingly, a UE feature group may be used to define the UE capability for supportable total beam management related reference signals, where the reference signals may be counted per slot across all component carriers. For example, 3GPP NR may define a UE feature group (e.g., FG 16-1g) in technical specification (TS) 38.306 to indicate the UE capability for counting resources such as SSB/CSI-RSs for L1-SINR measurement, the UE capability for counting resources for beam management, pathloss measurement, BFD, radio link monitoring and new beam identification, and the UE capability for counting resources for beam management, pathloss measurement, BFD, RLM and new beam identification across frequency ranges. In some aspects, the UE 120 may count all reference signals provided in the TCI states of the CORESET when counting resources for beam managements, in a total beam management related reference signal count per slot across all component carriers, e.g., for a UE feature group (FG) 16-1g. In some cases, the UE 120 may monitor two beams for monitoring a CORE-SET and detect the beam failure event based on implicitly determined BFD reference signals. For counting the resources for BFD reference signals in the UE feature group or the UE capability (e.g., FG 16-1g/16-1g-1), the UE 120 may count or base the count on all different quasi-co-location (QCL) reference signal resources for all CORE-SETs in an active bandwidth part, if a total number of different QCL reference signal resources of all CORESETs is more than two and an explicit BFD reference signal is not provided to the UE 120 by radio resource control (RRC) signaling. If there are two reference signals in a TCI state of a CORESET, the QCL source reference signal may be the one used for providing a QCL-Type D indication for the CORESET, and the QCL source reference signals may be periodic single port reference signals.

A base station (e.g., base station 110) may indicate a beam or QCL relation for UE. The UE may receive a TCI state switch command 308 to activate a receive beam that corresponds to TCI state used by the base station. The TCI state switch command 308 may be associated with measurements, preferred beam information, and/or TCI state information included in the beam report 304. The UE may receive the TCI state switch command within a maximum time duration 310 after the end of the last transmission of a reference signal from the first reference signal occasion 302. The duration between the end of the last transmission of the reference signal during the first reference signal occasion 302 and an end of the maximum time duration 310 may be referred to as a "known TCI state duration" 312. That is, the UE has information about ("knows") the TCI state for which the UE may receive the TCI state switch command 308. Outside of the known TCI duration 312, the UE may not have information about the TCI state, and/or the beam report 304 may be outdated.

The TCI state may be known if certain conditions are met. For example, during a period from the last transmission of the reference signal used for the beam report 304 for the target TCI state to the completion of an active TCI state switch, where the reference signal resource for L1-RSRP measurement is the reference signal in the target TCI state, or QCLed to the target TCI state, the TCI state switch command is received within 1280 ms of the first reference signal occasion 302. That is, the known TCI duration 312 is currently 1280 ms. During the known TCI duration 312, the UE may transmit the beam report 304 for the target TCI state before the TCI state switch command 308. The TCI state may remain detectable during the TCI state switching period in synchronization signal block (SSB) occasions that are available at the UE. If the SSB associated with the TCI state remains detectable during the TCI switching period in the available SSB occasions, and a signal-to-noise ratio (SNR) of the TCI state may be greater than or equal to −3 decibels (dB), the TCI state is known. Otherwise, the TCI state is unknown.

The UE may be uncertain about the known TCI duration. For example, there may be an invalid period 314 that occurs between the first reference signal occasion 302 and the maximum time duration 310. The invalid period may be a discontinuous reception (DRX) OFF period, a period outside of an active time for the UE, a period for a measurement gap, a period for radio frequency (RF) tuning, or some other period where the UE is not able to receive the TCI state switch command 308. In addition, a reference signal of a periodic configuration, such as a reference signal in the second reference signal occasion 306, may be received at a time that is not during a valid measurable occasion. A measurable occasion is not valid during an invalid period, such as during the invalid period 314. The uncertainty of whether the known TCI duration includes the invalid period 314 may cause the UE to receive the TCI state switch command 308 during the invalid period 314. As a result, the UE may fail to switch to an appropriate beam and cause communications to fail, wasting processing resources and signaling resources.

According to various aspects described herein, the UE may determine that the known TCI duration 312 excludes the invalid period 314, as shown in example 300. That is, the UE may not expect to receive the TCI state switch command 308 during an invalid period that is within the 1280 ms of the known TCI duration. However, the invalid period 314 may be large with respect to the maximum time duration 310 of the known TCI duration 312 (e.g., up to 80% of the maximum time duration 310). Therefore, in some aspects, the base station may extend the length of the maximum time duration 310 based at least in part on the invalid period 314. This may include adding a part or all of a length of the invalid period 314 to the maximum time duration 310, which effectively extends the length of the known TCI duration 312.

In some aspects, the known TCI duration 312 may start after a last transmission of a reference signal only if the reference occasion of the reference signal is in a valid measurable occasion. For example, the first reference signal occasion 302 may be during a valid measurable occasion. The valid measurable occasion may include an occasion during a time when the UE is active and configured to measure reference signals. The valid measurable occasion may exclude invalid periods. Accordingly, the known TCI duration 312 may start at an end of the first reference signal occasion 302. The second reference signal occasion may be during the invalid period 314 and thus is not during a valid measurable occasion. Accordingly, the known TCI duration 312 may not start at an end of the second reference signal occasion.

By clearly defining a known TCI duration to exclude invalid periods and enabling the known TCI duration to be extended, the UE may not miss a TCI state switch. As a result, the UE may conserve processing resources and signaling resources that would otherwise be consumed by failed communications and retransmissions.

As indicated above, FIG. 3 is provided as an example. Other examples may differ from what is described with regard to FIG. 3.

Figure 4:
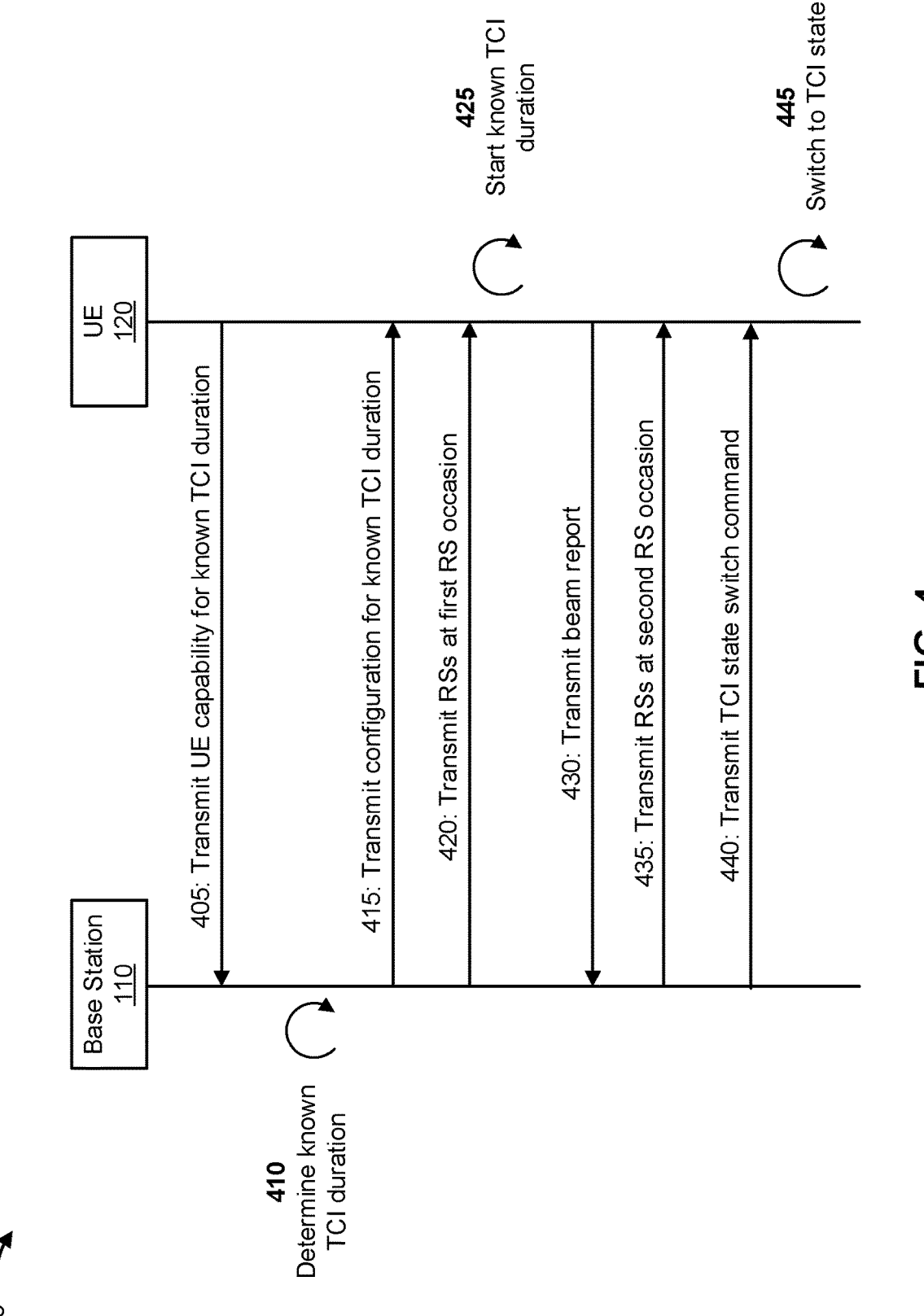
FIG. 4 is a diagram illustrating an example of using a known TCI duration, in accordance with the present disclosure.

FIG. 4 is a diagram illustrating an example 400 of using a known TCI duration, in accordance with the present disclosure. As shown in FIG. 4, a base station 110 and a UE 120 may communicate with one another.

As shown by reference number 405, the UE 120 may transmit a UE capability for a known TCI duration. The UE capability may be based at least in part on an ability of the UE 120 to handle a length of the known TCI duration and to provide reports for measurements of reference signals. The UE capability may also be based on information about invalid periods and valid measurable occasions. In some aspects, the UE 120 may transmit a UE capability to indicate that the supportable maximum known TCI duration is 512 ms or 2048 ms. As shown by reference number 410, the base station 110 may determine a known TCI duration based at least in part on the UE capability. In some aspects, the base station 110 may configure the known TCI duration, accounting for invalid periods. The base station 110 may configure the known TCI duration to be 512 ms, 1024 ms, or 2048 ms, if UE transmits a UE capability to indicate support of a maximum known TCI duration of 2048 ms. The base station 110 may configure the known TCI duration by RRC signaling, medium access control control element (MAC-CE) signaling, or system information.

As shown by reference number 415, the base station 110 may transmit a configuration for the known TCI duration. The configuration may indicate a length of a maximum time duration for a known TCI duration and/or an explicit length of the known TCI duration. The base station 110 schedules the UE 120 and thus is aware of the invalid periods. The known TCI duration transmitted by the base station 110 may extend a length of the known TCI duration by a length of the invalid periods.

As shown by reference number 420, the base station 110 may transmit reference signals during a first reference signal occasion. If the first reference signal occasion is during a valid measurable period, the UE 120 may start the known TCI duration, as shown by reference number 425. During the known TCI duration, the UE 120 may transmit a beam report, as shown by reference number 430. As shown by reference number 435, the base station 110 may transmit reference signals during a second reference signal occasion. If the second reference signal occasion is during an invalid period, the UE 120 may not transmit a beam report.

As shown by reference number 440, the base station 110 may transmit a TCI state switch command. The base station 110 may be aware of the known TCI duration and may transmit the TCI state switch command during the known TCI duration and not during an invalid period. The TCI state switch command may be based at least in part on the beam report and/or the UE capability. As shown by reference number 445, the UE 120 may switch to the TCI state indicated by the TCI state switch command. By clearly defining the known TCI duration to exclude invalid periods and by extending the known TCI duration as necessary, the base station 110 may improve reception of the TCI state switch command by the UE 120 and improve beamforming and communications by the base station 110 and the UE 120.

As indicated above, FIG. 4 is provided as an example. Other examples may differ from what is described with regard to FIG. 4.

Figure 5:
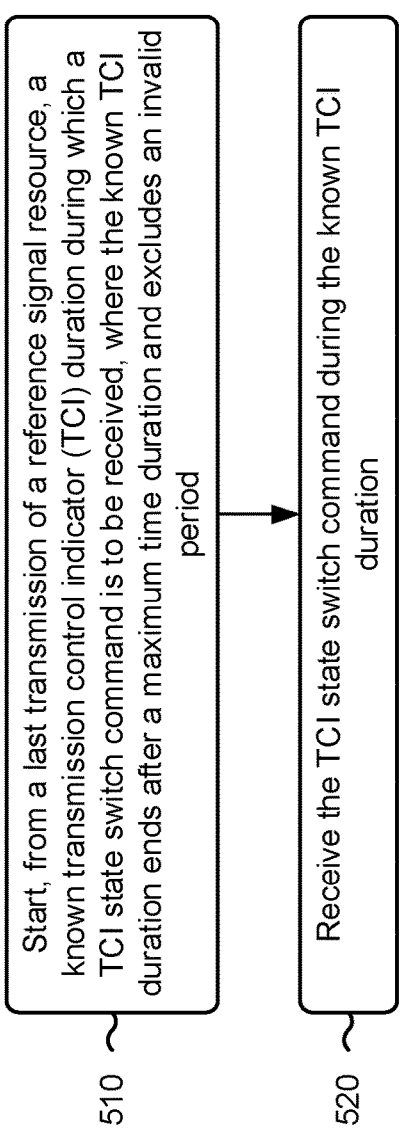
FIG. 5 is a diagram illustrating an example process performed, for example, by a UE, in accordance with the present disclosure.

FIG. 5 is a diagram illustrating an example process 500 performed, for example, by a UE, in accordance with the present disclosure. Example process 500 is an example where the UE (e.g., UE 120) performs operations associated with using a known TCI duration.

As shown in FIG. 5, in some aspects, process 500 may include starting, from a last transmission of a reference signal resource, a known TCI duration during which a TCI state switch command is to be received (block 510). For example, the UE (e.g., using TCI state component 708 depicted in FIG. 7) may start, from a last transmission of a reference signal resource, a known TCI duration during which a TCI state switch command is to be received, as described above. In some aspects, the known TCI duration ends after a maximum time duration and excludes an invalid period.

As further shown in FIG. 5, in some aspects, process 500 may include receiving the TCI state switch command during the known TCI duration (block 520). For example, the UE (e.g., using reception component 702 depicted in FIG. 7) may receive the TCI state switch command during the known TCI duration, as described above.

Process 500 may include additional aspects, such as any single aspect or any combination of aspects described below and/or in connection with one or more other processes described elsewhere herein.

In a first aspect, process 500 includes extending the maximum time duration based at least in part on a duration of the invalid period.

In a second aspect, alone or in combination with the first aspect, the invalid period includes one or more of a DRX OFF period, a period outside of an active time for the UE, a period for a measurement gap, or a period for RF tuning.

In a third aspect, alone or in combination with one or more of the first and second aspects, the maximum time duration is indicated by a base station.

In a fourth aspect, alone or in combination with one or more of the first through third aspects, process 500 includes transmitting an indication of a UE capability for the maximum time duration.

In a fifth aspect, alone or in combination with one or more of the first through fourth aspects, referencing signal resources are received in periodic occasions, and starting the known TCI duration includes starting the known TCI duration if the last transmission of the reference signal resource is received during a valid measurable occasion, and not starting the known TCI duration if the last transmission of the reference signal is received during an invalid period.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
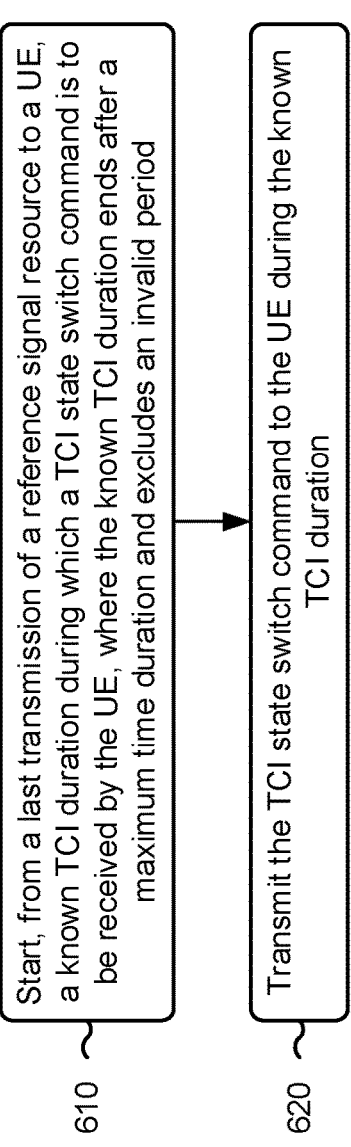
FIG. 6 is a diagram illustrating an example process performed, for example, by a base station, in accordance with the present disclosure.

FIG. 6 is a diagram illustrating an example process 600 performed, for example, by a base station, in accordance with the present disclosure. Example process 600 is an example where the base station (e.g., base station 110) performs operations associated with defining and using a known TCI duration.

As shown in FIG. 6, in some aspects, process 600 may include starting, from a last transmission of a reference signal resource to a UE, a known TCI duration during which a TCI state switch command is to be received by the UE (block 610). For example, the base station (e.g., using TCI state component 808 depicted in FIG. 8) may start, from a last transmission of a reference signal resource to a UE, a known TCI duration during which a TCI state switch command is to be received by the UE, as described above. In some aspects, the known TCI duration ends after a maximum time duration and excludes an invalid period.

As further shown in FIG. 6, in some aspects, process 600 may include transmitting the TCI state switch command to the UE during the known TCI duration (block 620). For example, the base station (e.g., using transmission component 804 depicted in FIG. 8) may transmit the TCI state switch command to the UE during the known TCI duration, as described above.

Process 600 may include additional aspects, such as any single aspect or any combination of aspects described below and/or in connection with one or more other processes described elsewhere herein.

In a first aspect, the maximum time duration is extended based at least in part on a duration of the invalid period.

In a second aspect, alone or in combination with the first aspect, the invalid period includes one or more of a DRX OFF period, a period outside of an active time for the UE, a period for a measurement gap, or a period for RF tuning.

In a third aspect, alone or in combination with one or more of the first and second aspects, process 600 includes transmitting an indication of the maximum time duration to the UE.

In a fourth aspect, alone or in combination with one or more of the first through third aspects, process 600 includes receiving a UE capability for the maximum time duration, and transmitting an indication of the maximum time duration to the UE that is based at least in part on the UE capability.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
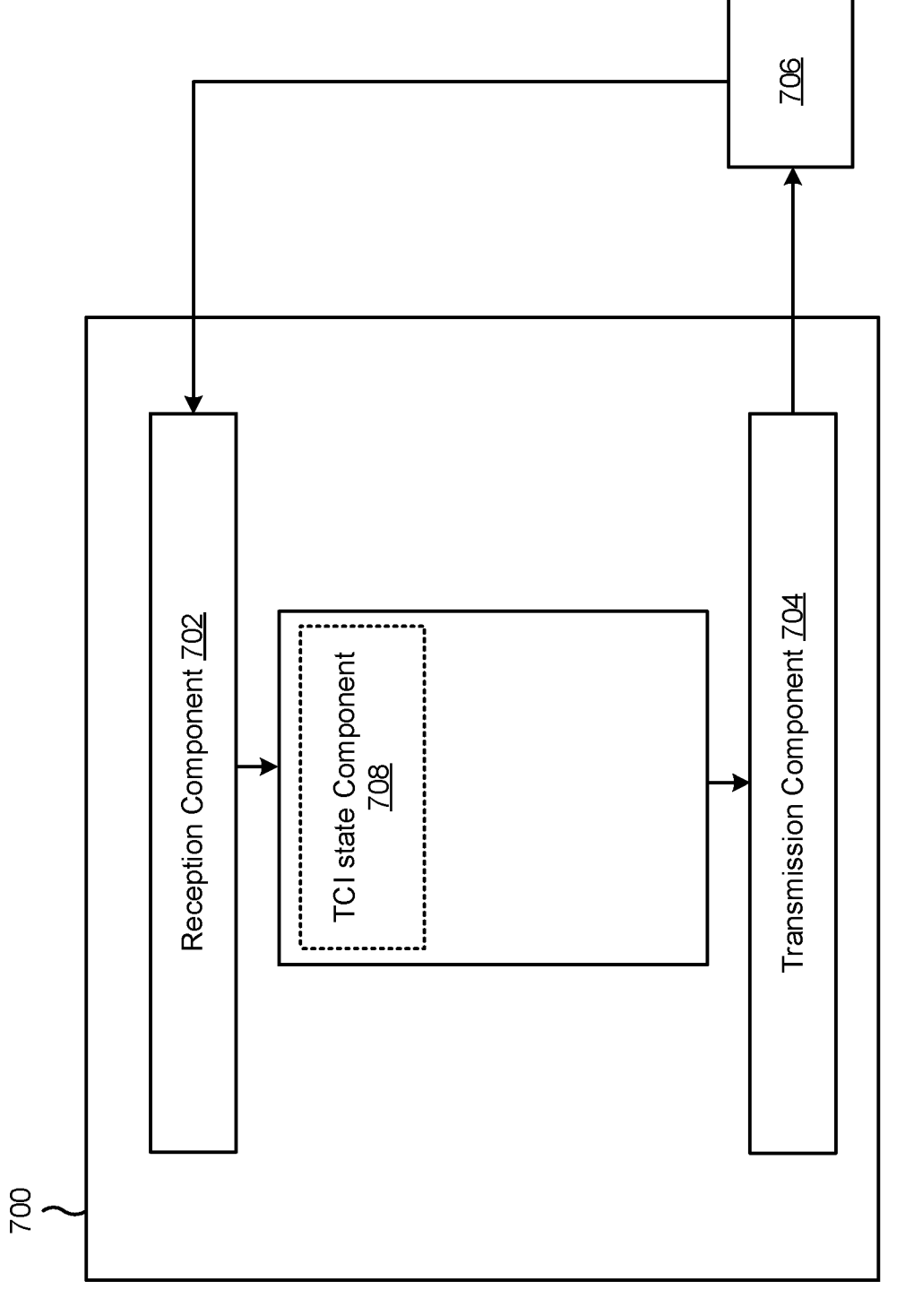
FIGS. 7-8 are block diagrams of example apparatuses for wireless communication, in accordance with the present disclosure.

FIG. 7 is a block diagram of an example apparatus 700 for wireless communication. The apparatus 700 may be a UE, or a UE may include the apparatus 700. In some aspects, the apparatus 700 includes a reception component 702 and a transmission component 704, which may be in communication with one another (for example, via one or more buses and/or one or more other components). As shown, the apparatus 700 may communicate with another apparatus 706 (such as a UE, a base station, or another wireless communication device) using the reception component 702 and the transmission component 704. As further shown, the apparatus 700 may include a TCI state component 708, among other examples.

In some aspects, the apparatus 700 may be configured to perform one or more operations described herein in connection with FIGS. 1-4. Additionally, or alternatively, the apparatus 700 may be configured to perform one or more processes described herein, such as process 500 of FIG. 5. In some aspects, the apparatus 700 and/or one or more components shown in FIG. 7 may include one or more components of the UE described above in connection with FIG. 2. Additionally, or alternatively, one or more components shown in FIG. 7 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 702 may receive communications, such as reference signals, control information, data communications, or a combination thereof, from the apparatus 706. The reception component 702 may provide received communications to one or more other components of the apparatus 700. In some aspects, the reception component 702 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 706. In some aspects, the reception component 702 may include one or more antennas, a demodulator, a MIMO detector, a receive processor, a controller/processor, a memory, or a combination thereof, of the UE described above in connection with FIG. 2.

The transmission component 704 may transmit communications, such as reference signals, control information, data communications, or a combination thereof, to the apparatus 706. In some aspects, one or more other components of the apparatus 706 may generate communications and may provide the generated communications to the transmission component 704 for transmission to the apparatus 706. In some aspects, the transmission component 704 may perform signal processing on the generated communications (such as filtering, amplification, modulation, digital-to-analog conversion, multiplexing, interleaving, mapping, or encoding, among other examples), and may transmit the processed signals to the apparatus 706. In some aspects, the transmission component 704 may include one or more antennas, a modulator, a transmit MIMO processor, a transmit processor, a controller/processor, a memory, or a combination thereof, of the UE described above in connection with FIG. 2. In some aspects, the transmission component 704 may be co-located with the reception component 702 in a transceiver.

The TCI state component 708 may start, from a last transmission of a reference signal resource, a known TCI duration during which a TCI state switch command is to be received, where the known TCI duration ends after a maximum time duration and excludes an invalid period. The reception component 702 may receive the TCI state switch command during the known TCI duration. The TCI state component 708 may extend the maximum time duration based at least in part on a duration of the invalid period. The transmission component 704 may transmit an indication of a UE capability for the maximum time duration.

The number and arrangement of components shown in FIG. 7 are provided as an example. In practice, there may be additional components, fewer components, different components, or differently arranged components than those shown in FIG. 7. Furthermore, two or more components shown in FIG. 7 may be implemented within a single component, or a single component shown in FIG. 7 may be implemented as multiple, distributed components. Additionally, or alternatively, a set of (one or more) components shown in FIG. 7 may perform one or more functions described as being performed by another set of components shown in FIG. 7.

Figure 8:
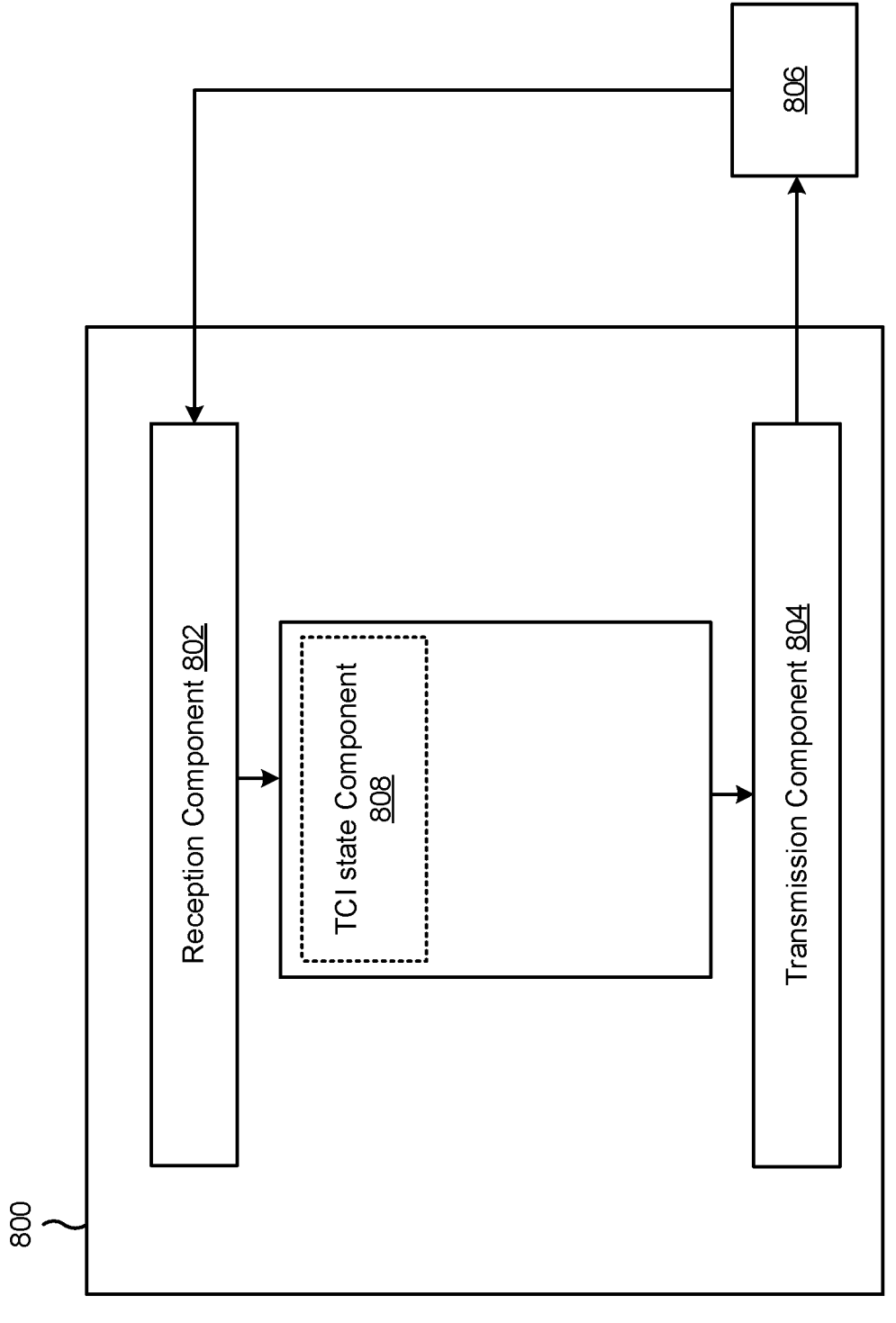

FIG. 8 is a block diagram of an example apparatus 800 for wireless communication. The apparatus 800 may be a base station, or a base station may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a TCI state component 808, among other examples.

In some aspects, the apparatus 800 may be configured to perform one or more operations described herein in connection with FIGS. 1-4. Additionally, or alternatively, the apparatus 800 may be configured to perform one or more processes described herein, such as process 600 of FIG. 6. In some aspects, the apparatus 800 and/or one or more components shown in FIG. 8 may include one or more components of the base station described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the base station described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the base station described above in connection with FIG. 2. In some aspects, the transmission component 804 may be co-located with the reception component 802 in a transceiver.

The TCI state component 808 may start, from a last transmission of a reference signal resource to a UE, a known TCI duration during which a TCI state switch command is to be received by the UE, where the known TCI duration ends after a maximum time duration and excludes an invalid period. The transmission component 804 may transmit the TCI state switch command to the UE during the known TCI duration.

The transmission component 804 may transmit an indication of the maximum time duration to the UE. The reception component 802 may receive a UE capability for the maximum time duration. The transmission component 804 may transmit an indication of the maximum time duration to the UE that is based at least in part on the UE capability.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The foregoing disclosure provides illustration and description, but is not intended to be exhaustive or to limit the aspects to the precise forms disclosed. Modifications and variations may be made in light of the above disclosure or may be acquired from practice of the aspects.

The following provides an overview of some Aspects of the present disclosure:

Aspect 1: A method of wireless communication performed by a user equipment (UE), comprising: starting, from a last transmission of a reference signal resource, a known transmission control indicator (TCI) duration during which a TCI state switch command is to be received, wherein the known TCI duration ends after a maximum time duration and excludes an invalid period; and receiving the TCI state switch command during the known TCI duration.

Aspect 2: The method of Aspect 1, further comprising extending the maximum time duration based at least in part on a duration of the invalid period.

Aspect 3: The method of Aspect 1 or 2, wherein the invalid period includes one or more of a discontinuous reception off period, a period outside of an active time for the UE, a period for a measurement gap, or a period for radio frequency tuning.

Aspect 4: The method of any of Aspects 1-3, wherein the maximum time duration is indicated by a base station.

Aspect 5: The method of any of Aspects 1-4, further comprising transmitting an indication of a UE capability for the maximum time duration.

Aspect 6: The method of any of Aspects 1-5, wherein reference signal resources are received in periodic occasions, and wherein starting the known TCI duration includes starting the known TCI duration if the last transmission of the reference signal resource is received during a valid measurable occasion, and not starting the known TCI duration if the last transmission of the reference signal is received during an invalid period.

Aspect 7: A method of wireless communication performed by a base station, comprising: starting, from a last transmission of a reference signal resource to a user equipment (UE), a known transmission control indicator (TCI) duration during which a TCI state switch command is to be received by the UE, wherein the known TCI duration ends after a maximum time duration and excludes an invalid period; and transmitting the TCI state switch command to the UE during the known TCI duration.

Aspect 8: The method of Aspect 7, wherein the maximum time duration is extended based at least in part on a duration of the invalid period.

Aspect 9: The method of Aspect 7 or 8, wherein the invalid period includes one or more of a discontinuous reception off period, a period outside of an active time for the UE, a period for a measurement gap, or a period for radio frequency tuning.

Aspect 10: The method of any of Aspects 7-9, further comprising transmitting an indication of the maximum time duration to the UE.

Aspect 11: The method of any of Aspects 7-10, further comprising: receiving a UE capability for the maximum time duration; and transmitting an indication of the maximum time duration to the UE that is based at least in part on the UE capability.

Aspect 12: An apparatus for wireless communication at a device, comprising a processor; memory coupled with the processor; and instructions stored in the memory and executable by the processor to cause the apparatus to perform the method of one or more of Aspects 1-11.

Aspect 13: A device for wireless communication, comprising a memory and one or more processors coupled to the memory, the memory and the one or more processors configured to perform the method of one or more of Aspects 1-11.

Aspect 14: An apparatus for wireless communication, comprising at least one means for performing the method of one or more of Aspects 1-11.

Aspect 15: A non-transitory computer-readable medium storing code for wireless communication, the code comprising instructions executable by a processor to perform the method of one or more of Aspects 1-11.

Aspect 16: A non-transitory computer-readable medium storing a set of instructions for wireless communication, the set of instructions comprising one or more instructions that, when executed by one or more processors of a device, cause the device to perform the method of one or more of Aspects 1-11.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:

one or more memories; and one or more processors, coupled to the one or more memories, configured to cause the UE to:

start, from a last transmission of a reference signal resource, a known transmission control indicator (TCI) duration during which a TCI state switch command is to be received, wherein the known TCI duration ends after a maximum time duration and excludes an invalid period, and wherein the known TCI duration is started in response to the last transmission of the reference signal resource occurring during a valid measurable occasion; and receive the TCI state switch command during the known TCI duration.

2. The UE of claim 1, wherein the one or more processors are configured to cause the UE to extend the maximum time duration based at least in part on a duration of the invalid period.

3. The UE of claim 1, wherein the invalid period includes one or more of a discontinuous reception off period, a period outside of an active time for the UE, a period for a measurement gap, or a period for radio frequency tuning.

4. The UE of claim 1, wherein the maximum time duration is indicated by a network entity.

5. The UE of claim 1, wherein the one or more processors are configured to cause the UE to transmit an indication of a UE capability for the maximum time duration.

6. The UE of claim 1, wherein reference signal resources are received in periodic occasions, and wherein the one or more processors are configured to cause the UE to refrain from starting the known TCI duration in instances where the last transmission of the reference signal is received during an invalid period.

7. A network entity for wireless communication, comprising:

one or more memories; and one or more processors, coupled to the one or more memories, configured to cause the network entity to:

start, from a last transmission of a reference signal resource to a user equipment (UE), a known transmission control indicator (TCI) duration during which a TCI state switch command is to be received by the UE, wherein the known TCI duration ends after a maximum time duration and excludes an invalid period, and wherein the known TCI duration is started in response to the last transmission of the reference signal resource to the UE occurring during a valid measurable occasion; and transmit the TCI state switch command to the UE during the known TCI duration.

8. The network entity of claim 7, wherein the maximum time duration is extended based at least in part on a duration of the invalid period.

9. The network entity of claim 7, wherein the invalid period includes one or more of a discontinuous reception off period, a period outside of an active time for the UE, a period for a measurement gap, or a period for radio frequency tuning.

10. The network entity of claim 7, wherein the one or more processors are configured to cause the network entity to transmit an indication of the maximum time duration to the UE.

11. The network entity of claim 7, wherein the one or more processors are configured to cause the network entity to:

receive a UE capability for the maximum time duration; and transmit an indication of the maximum time duration to the UE that is based at least in part on the UE capability.

12. A method of wireless communication performed by a user equipment (UE), comprising:

starting, from a last transmission of a reference signal resource, a known transmission control indicator (TCI) duration during which a TCI state switch command is to be received, wherein the known TCI duration ends after a maximum time duration and excludes an invalid period, and wherein the known TCI duration is started in response to the last transmission of the reference signal resource occurring during a valid measurable occasion; and receiving the TCI state switch command during the known TCI duration.

13. The method of claim 12, further comprising extending the maximum time duration based at least in part on a duration of the invalid period.

14. The method of claim 12, wherein the invalid period includes one or more of a discontinuous reception off period, a period outside of an active time for the UE, a period for a measurement gap, or a period for radio frequency tuning.

15. The method of claim 12, wherein the maximum time duration is indicated by a network entity.

16. The method of claim 12, further comprising transmitting an indication of a UE capability for the maximum time duration.

17. The method of claim 12, wherein reference signal resources are received in periodic occasions, and wherein the method further comprises refraining from starting the known TCI duration in instances where the last transmission of the reference signal is received during an invalid period.

18. A method of wireless communication performed by a network entity, comprising:

starting, from a last transmission of a reference signal resource to a user equipment (UE), a known transmission control indicator (TCI) duration during which a TCI state switch command is to be received by the UE, wherein the known TCI duration ends after a maximum time duration and excludes an invalid period, and wherein the known TCI duration is started in response to the last transmission of the reference signal resource to the UE occurring during a valid measurable occasion; and transmitting the TCI state switch command to the UE during the known TCI duration.

19. The method of claim 18, wherein the maximum time duration is extended based at least in part on a duration of the invalid period.

20. The method of claim 18, wherein the invalid period includes one or more of a discontinuous reception off period, a period outside of an active time for the UE, a period for a measurement gap, or a period for radio frequency tuning.

21. The method of claim 18, further comprising transmitting an indication of the maximum time duration to the UE.

22. The method of claim 18, further comprising:

receiving a UE capability for the maximum time duration; and transmitting an indication of the maximum time duration to the UE that is based at least in part on the UE capability.

23. The UE of claim 1, wherein the one or more processors are configured to transmit a beam report during the known TCI duration.

24. The UE of claim 1, wherein the one or more processors are configured to switch to the TCI state indicated by the TCI state switch command.

* * * * *